July 29, 1952          C. J. DAVIS          2,604,843

GRIDIRON OR BROILING RACK

Filed April 22, 1950

CHARLES J. DAVIS
Inventor

Hubert Miller
Attorney

By

Patented July 29, 1952

2,604,843

UNITED STATES PATENT OFFICE 2,604,843

GRIDIRON OR BROILING RACK

Charles J. Davis, Derby, Kans.

Application April 22, 1950, Serial No. 157,440

3 Claims. (Cl. 99—450)

This invention relates to a utensil for broiling foods and more particularly to an improved broiler surface for supporting food during the broiling operation, whether the heat be directed on the food from above or from below.

It is an object of the invention to provide a device of this class which is variable in width and will fit in the broiling compartment of various kitchen stoves, yet which may be easily removed from the stove and used for the outdoor broiling of steaks, etc., over an open bed of coals.

Additional objects are to provide a broiler which is much easier to clean than various types of conventional broilers now in use and for sale, which presents much less obstruction to the direct transmission of heat from the heat source to the broiler supported food than commonly used broilers, and which greatly reduces the "smoking" of the supported food because the grease from the food is not retained on the food supporting portion of the broiler, all because the food rests on a grid of fine steel wires tightly stretched on a highly rigid open frame.

The invention, together with other objects attending its production, will be more clearly understood when the following description is read in connection with the accompanying drawing, which illustrates a preferred embodiment of the invention.

Figure 1:
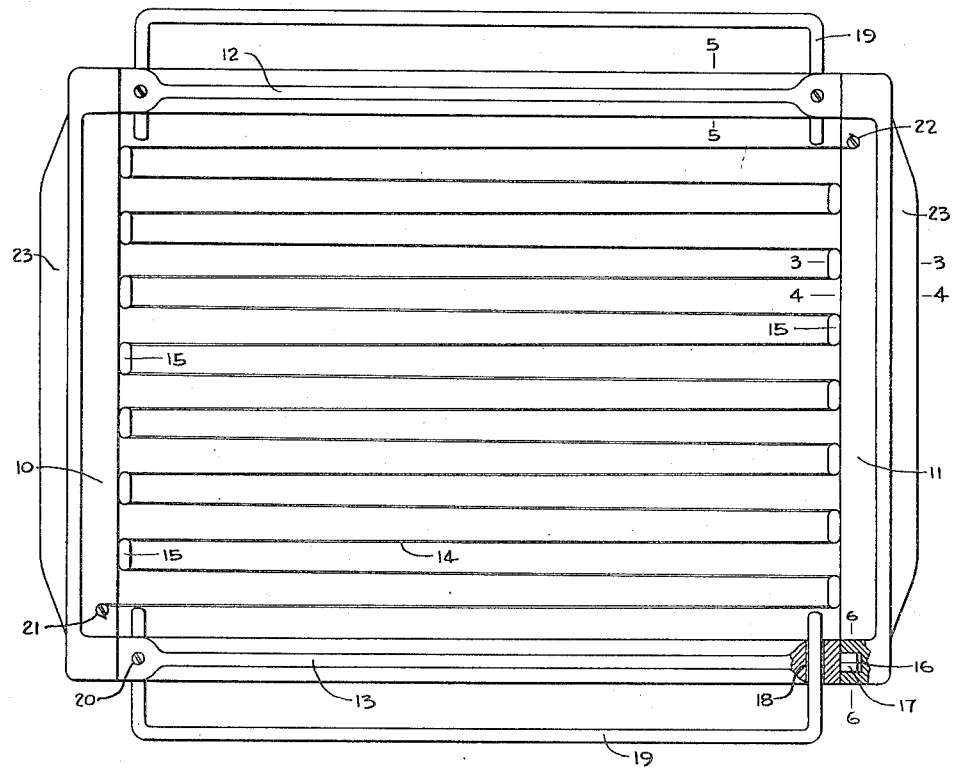
Fig. 1 is a top plane view of a broiler embodying the invention.
Figure 3:
Figure 2:
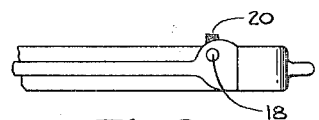
Fig. 2 is a fragmentary side view of the broiler of Fig. 1.
Figure 4:
Figure 5:
Figure 6:
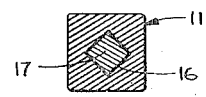
Figure 7:
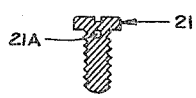

Figs. 3, 4, 5, and 6 are sectional views taken along the lines 3—3, 4—4, 5—5, and 6—6, respectively, of Fig. 1;

Fig. 7 is a vertical sectional view through one of the wire grid tightening screws shown in Fig. 1.

Referring to Fig. 1 it will be seen that the broiler comprises two end frame members 10 and 11, two side frame members 12 and 13, and a single piece of stainless steel wire 14 tightly stretched in parallel runs between the end members 10 and 11.

Each end member is provided with a plurality of relatively wide integral hooks 15 which are preferably spaced apart a distance approximately equivalent to their width. The hooks on one end member are staggered in relation to the hooks on the other end member. The cross sectional shapes of the end members are clearly shown in Figs. 3 and 4. It will be seen that the arrangement of ribs lends extreme rigidity to these members.

Near each of its ends, each end member is provided with a socket 16 of irregular cross section to receive a pin 17, of complemental irregular cross section, which is integrally formed at each end of each of the side members 12 and 13. The fit of the pins 17 into the respective sockets 16 is substantially a press fit.

Near each of its ends each side member is provided with a laterally disposed hole 18 and a communicating threaded hole drilled through the upper surface of the member. These holes 18 are provided to snugly but slidably receive the parallel legs of substantially U-shaped broiler supporting members 19. Set screws 20 fitted into the holes which are drilled vertically into the upper surfaces of these side members serve to lock the supports 19 in any desired position with relation to their respective side members 12 and 13. The set screws 20 may thus be loosened and the supports 19 pulled outwardly to increase the width of the broiler, or pushed inwardly to decrease its width.

After the end and side members have been assembled, as illustrated in Fig. 1, one end of the wire 14 is inserted into a laterally bored hole 21A in the shank of screw 21, and the screw is tightened. A continuous zigzag wrapping of the wire is then accomplished by looping it around the oppositely positioned hook 15 on the opposite end member 10, and then continuing to loop the wire around the oppositely positioned hooks 15, in sequence. The wire runs are tightened as the stringing proceeds, and the other end of the wire is then inserted in the lateral hole in identical screw 22. The desired tension is then placed on each run of the wire in a manner similar to the manner in which the strings of a tennis racket are tightened, and the screws 21 and 22 retightened to maintain this tension. The parallel legs of the support members 19 are then inserted in the holes in the respective side members, and the assembly is complete.

It will be understood that by properly spacing the side members 19, the broiler can be made to fit practically any broiler compartment on any kitchen stove. It will also be understood that with these side members extended the two sides of the broiler may be rested on rocks, bricks or any other spaced supports for broiling food over an open fire. The rigidity of both the side and end members, as evidenced by their heavy ribbed construction, produces an almost integral frame—one that will maintain its planar form regardless of the tension placed on the food supporting wire 14. The ribs 23, 24 and 25 on the end members 10 and 11 are so positioned with relation to each other that they form very convenient handles at the opposite ends of this broiler. The wire 14 is so small in diameter that it presents an extremely small surface area for contact with the food. Sticking of the food on the grid is thus reduced to a minimum, and the grid presents practically no surface area on which grease can be retained to burn and smoke.

The foregoing detailed description of one embodiment of the invention has been given for the sole purpose of describing the construction, and it is understood that many other constructions and modifications may be made within the spirit of the invention.

Having described the construction and use of the invention in sufficient detail to enable those familiar with the art to construct and use it, I claim:

1. A rectangular food supporting broiler comprising a pair of rigid end members and a pair of cooperating rigid side members, all of the same thickness; a laterally disposed inwardly opening blind socket of non-circular cross section near each end of each end member, the two sockets in each end member being spaced identically; a longitudinally disposed pin of reduced size at each end of each side member complementally fitted tightly into the four sockets in the two end members to form a rectangular planar frame of constant thickness; spaced outwardly opening hooks projecting inwardly and arranged in longitudinal alignment along the inner edge of each end member and integral therewith, the spacing and the width of said hooks being substantially the same, and said hooks being disposed in a common plane lying between and parallel to the opposite flat surfaces of said frame; and a strand of fine flexible steel wire tightly stretched back and forth over consecutive hooks and serving as a means of locking the end members to the side members, and as a means of supporting food.

2. The broiler described in claim 1 and screw means carried by the end members for increasing the tension on said wire and for anchoring the ends thereof.

3. The broiler described in claim 1, and a laterally disposed hole near each end of each side member; substantially U-shaped support members having their two parallel legs inserted in the holes in each side member; and set screws in said side members for contacting and maintaining the legs of said support members in desired positions.

CHARLES J. DAVIS.

REFERENCES CITED

The following references are of record in the file of this patent:

UNITED STATES PATENTS

| Number | Name | Date |
|---|---|---|
| 465,024 | Kraber | Dec. 15, 1891 |
| 701,198 | Grant | May 27, 1902 |
| 1,027,020 | Waters | May 21, 1912 |
| 1,062,499 | Pielert | May 20, 1913 |
| 1,076,130 | Lombardi | Oct. 21, 1913 |
| 1,237,875 | Dickerson | Aug. 21, 1917 |
| 1,999,806 | Eitel et al. | Apr. 30, 1935 |
| 2,006,385 | Dikeman | July 2, 1935 |
| 2,099,693 | Laffitte | Nov. 23, 1937 |
| 2,144,278 | Wallace | Jan. 17, 1939 |
| 2,152,198 | Lowenfels | Mar. 28, 1939 |

FOREIGN PATENTS

| Number | Country | Date |
|---|---|---|
| 363,792 | Great Britain | Nov. 19, 1930 |
| 520,135 | Great Britain | Apr. 16, 1940 |